Feb. 11, 1930.  J. HERIER  1,746,309
SUPERCHARGER
Filed March 5, 1928

INVENTOR
Joseph Herier
BY
Carl H. Crawford
ATTORNEY

Patented Feb. 11, 1930

1,746,309

UNITED STATES PATENT OFFICE

JOSEPH HERIER, OF AVERY, IDAHO

SUPERCHARGER

Application filed March 5, 1928. Serial No. 259,307.

The object of this invention is to provide an improved supercharger for explosion engines.

A feature of the invention resides in supplying air under pressure to the usual fuel pipe leading from the carburetor to the engine cylinder preferably in the form of an injected stream of air.

A further feature consists in equipping the air injection means with devices for inducing a flow of the mixture to the cylinder in a more rapid rate than heretofore, the result being that instead of the piston sucking or drawing in a charge, the charge will be positively fed into the cylinder as the piston thereof descends.

A further feature resides in operating means for controlling the usual carburetor air intake valve and also the valve for air injection, preferably in such a manner that air injection will not take place until after the carburetor valve has been opened to a certain extent.

The invention will be more fully described in connection with the accompanying drawing and will be more particularly pointed out in and by the appended claims.

In the drawing.

Like characters of reference designate similar parts throughout the different figures of the drawing.

Figure 1:
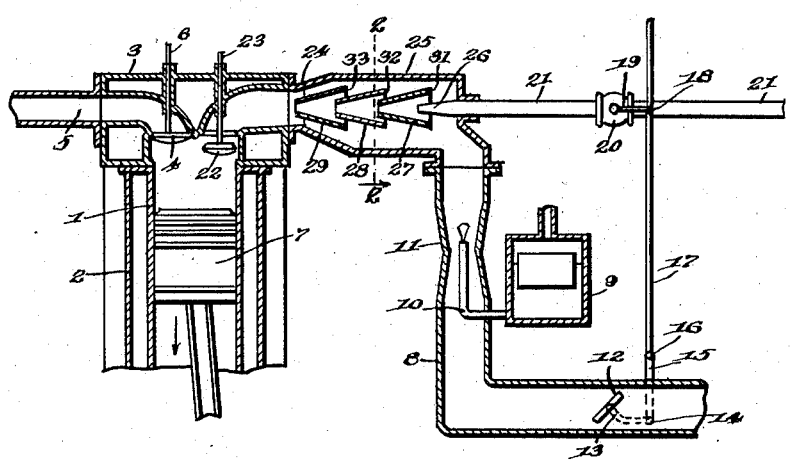
Fig. 1, is a sectional view of a cylinder of an explosion engine and carburetor equipped with one form of the device of my invention.

In order to make clear the application of my invention, I have very generally shown a cylinder 1, of an explosion engine, with the usual water jacket 2. In the head 3, I have shown the exhaust valve 4 and the exhaust manifold 5, the stem 6, of valve 4 projecting, as shown. The piston 7, is shown descending for drawing in a charge of fuel mixture, as is usual.

I have very generally shown a fuel pipe 8 and a carbureter structure which may consist of a float fuel tank 9, having a tube 10, that leads into a Venturi section 11, of pipe 8. An air intake valve 12, is provided, and as shown said valve is located in the fuel pipe in advance of the carbureter, with respect to the direction of flow of the fuel, although this particular type and location of said carbureter valve is not essential to the operative completeness of my invention. Said valve 12, is shown provided with an arm 13, to which is pivoted at 14, a link 15, which is in turn pivoted at 16, to a rod 17. Rod 17, is pivoted at 18, to the arm 19, of an air induction controlling valve 20, which is interposed in an air pipe 21, that may be connected with any suitable source of air supply under pressure. The fuel pipe delivers to the cylinder head 3, and intake is controlled by a valve 22, having a stem 23, as clearly shown.

It is well known that atmospheric pressure is the usual and actual medium for charging an explosion engine cylinder when the piston thereof is descending, and that as a matter of fact, the intake stroke of the piston does not actually suck in a charge. However, owing to the rapidity of movement of the piston, at the higher speeds, and owing to the fact that a thinner mixture may be efficiently employed at higher speeds, it is an object and a very special feature of this invention to increase the volume of air with respect to the volume of mixture at such higher speeds so that the engine can be run at a far more economical basis than formerly.

Thus, more specifically considered, it is a feature of my invention to employ air under pressure and inject the air into the cylinder during the intake stroke, and in combination with this feature, it is an object of my invention to employ this injected air to induce a flow of the mixture, all of which features will now be more specifically described.

Figure 2:
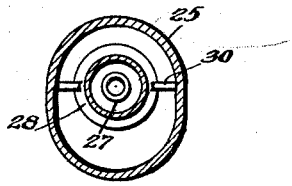
Fig. 2, is an enlarged sectional view on line 2—2 of Fig. 1.

The discharge portion of the fuel pipe has a Venturi section 24 which is a part of an enlarged section that I will designate at 25, that is interposed in the fuel pipe. The cross section of said section 25, is clearly shown in Fig. 2, of the drawing. The pipe 21, enters this section 25 and has a reduced nozzle end 26, through which air under pressure is discharged. A series of induction or inducing cones 27, 28 and 29, are disposed in partly telescopic relation and are suitably supported in section 25 by arms 30 so that the rear or belled ends of each cone will be open and there will be a plurality of induction openings or intakes 31, 32 and 33, into which the fuel mixture will be drawn, when the air is flowing or discharging from nozzle 26. The enlarged cross section of portion 25, affords the fuel mixture ample room for such ingress into and through said openings 31 to 33, and it will be understood that more or less of said openings may be provided, within the subjoined claims. The Venturi section 24, serves the useful purpose, for which it is known, in the relation shown, especially when the injection air is not employed, but even when the injection air is employed, it is of value.

Figure 3:
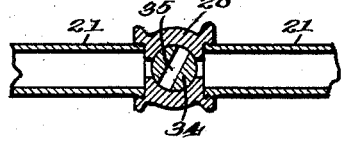
Fig. 3, is an enlarged view in section of a valve for controlling air for injection purposes, the valve being shown closed.
Figure 4:
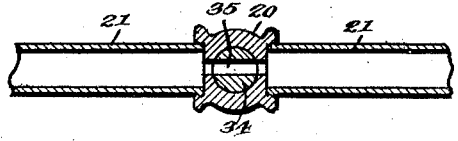
Fig. 4, is a similar view with said valve open.

The valve 19 is shown provided with a plug 34 having a port 35, that is normally out of registry with the pipe 21, as shown in Fig. 3. This is true when the engine is not running and also when the engine is running at relatively low speeds, or in other words, when the carbureter valve 12, is only partly open. When the valve 12, is more fully opened, then the hereinbefore described mechanism for synchronously operating said valves 12 and 34, will act to also open the latter, as shown in Fig. 4, and allow injection air to enter section 25. This mechanism will be in practice, connected up with the usual control that is accessible to the driver of the vehicle.

It will now be clear that at relatively slow speeds, the fuel mixture will be fed from the carbureter in the usual way, on each intake stroke of the piston 7, as for instance when a relatively rich mixture is required. The Venturi section 24, will then come most effectively into play and there will be ample room for the mixture to enter and pass through section 25, either through or around the induction cones 27 to 29.

Now assume that a higher speed was attained, then, the plug 34 would admit injection air and the engine would be fed with a relatively thin mixture, and yet, the feed would be ample to fully charge the cylinder at each intake stroke of the piston thereof. There would be a clear preponderance of air in the mixture, that is, a far greater preponderance than at slow speed, and yet, the injection air would induce a relatively increased flow of the mixture so that the latter would not be too thin. Thus, it will now be clear that my air injection feature performs the added function of also inducing a sufficient rapid flow of the mixture to conform with the requirements of the engine, at all relatively high speeds.

It is believed that the device of my invention will be fully understood from the foregoing description, and while I have herein shown and described one specific form of my invention, I do not wish to be limited thereto except for such limitations as the claims may import.

I claim:

1. In a means for supercharging an explosion engine cylinder, a fuel supply pipe delivering to said cylinder, a carbureter delivering to said pipe and having an air intake controlling valve, a combined air injecting and mixture inducing device interposed in said pipe between said cylinder and carbureter, a normally closed valve for controlling the supply of air under pressure to said device, and mechanism for sequentially opening said air intake valve and said controlling valve of said device.

2. In a means for supercharging an explosion engine cylinder, a fuel supply pipe delivering to said cylinder, a carbureter delivering to said pipe and having an air valve, a combined air injecting and mixture inducing device interposed in said pipe between said cylinder and carbureter and having a controlling valve, and mechanism for opening said controlling valve after said air valve has been opened.

In witness whereof, I have hereunto affixed my signature.

JOSEPH HERIER.